June 15, 1965 W. B. DRURY 3,189,278
VALVE
Filed Dec. 21, 1962 2 Sheets-Sheet 1

INVENTOR
WILLIAM B. DRURY
BY
Robertson and Smythe
ATTORNEYS

June 15, 1965  W. B. DRURY  3,189,278
VALVE
Filed Dec. 21, 1962  2 Sheets-Sheet 2

INVENTOR
WILLIAM B. DRURY
BY
Robertson & Smythe
ATTORNEYS

United States Patent Office 3,189,278
Patented June 15, 1965

3,189,278
VALVE
William B. Drury, Providence, R.I., assignor to Taco, Inc., a corporation of New York
Filed Dec. 21, 1962, Ser. No. 246,441
10 Claims. (Cl. 237—56)

This invention relates to valves and particularly to a combined balancing and purge valve for hot water heating systems.

In hot water heating systems where different parts of the system are utilized to heat different parts of a building, it often becomes necessary to provide a greater or lesser amount of the heating fluid to one part of the system than to another, requiring a balancing arrangement for controlling the flow of heating fluid to the separate parts of the system. Additionally, in such systems it often becomes desirable to purge each part of the system independently of the others, for cleaning or repair purposes, while still supplying heat to the other parts of the system.

The principal object of this invention is to provide a combined balancing and purge valve for hot water heating systems.

Another object of the invention is to provide such a valve having two inlets and a common return outlet.

In one aspect of the invention, a valve body may comprise a central chamber having three ports therein adapted to be controlled by a plug. Two of the ports may comprise separate inlets and the third a return outlet.

In another aspect of the invention, the two inlets may be connected to separate bypass duct means within the valve body that lead to a drain outlet for the valve.

In still another aspect of the invention, the plug may be provided with separate means for controlling the inlets and return outlet, as well as the bypass to the drain outlet.

In still another aspect of the invention, the balancing and purge valve may be installed within two return lines of a hot water system such that normally both return lines feed through the valve simultaneously to a boiler.

In another aspect of the invention, the plug of the combined purge and balancing valve may be turned to different angular positions in which different amounts of heating fluid may be returned to the return outlet from the separate inlets while both bypass means may be blocked, thereby to control the heating effect of the separate parts of the system connected to the separate inlets.

In a still further aspect of the invention, the valve construction may be such that when the valve is turned in one direction, the first return inlet port feeds to the boiler while the second return inlet port bypasses to drain, and upon turning the plug of the valve to another position, the second return inlet port is connected to the boiler and the first to the bypass leading to the drain. Accordingly, either of the return lines connected to the separate return inlets of the valve may be purged independently of the other.

The above, other objects and novel features of the invention will become apparent from the following specification and accompanying drawings which are merely exemplary.

Figure 11:
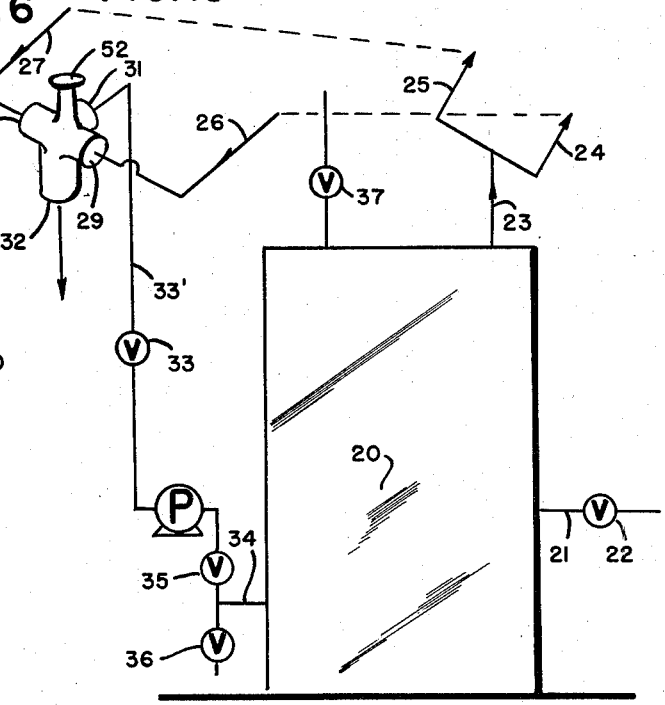
FIG. 11 is a schematic view of a hot water heating system employing the valve of this invention.

Referring to the drawings, and particularly to FIG. 11, a hot water heating system is shown as including a boiler 20 having a make-up supply line 21 leading from a water supply and controlled by a valve 22. An outlet line 23 may be connected to separate lines 24, 25 leading to heating devices to be supplied with heating fluid, such as hot water radiators for heating a building all of which include inlet valves. Return lines 26 and 27 may lead from separate parts of the system that supplies heat to separate parts of the building. Lines 26 and 27 may lead to a balancing and purge valve 28 having separate inlet ports 29, 30; a common return outlet port 31; and a common purge outlet port 32, the latter leading to drain.

The common return outlet port 31 may be connected to a pump P through a valve 33, thence to a line 34 past a valve 35 to the boiler 20. A drain valve 36 may be provided for draining the boiler 20. The boiler 20 may have the usual safety relief valve 37, and an expansion tank (not shown) may be connected to the line in which valve 37 is located.

Figure 4:
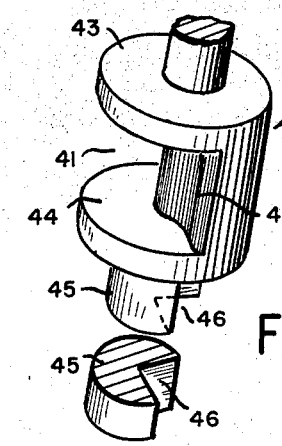
FIG. 4 is a perspective view of the plug for the valve shown in FIG. 1.
Figure 3:
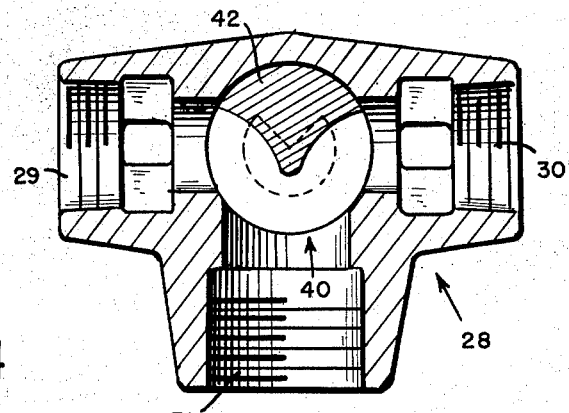
FIG. 3 is a sectional view taken substantially along line 3—3 of FIG. 2.
Figure 1:
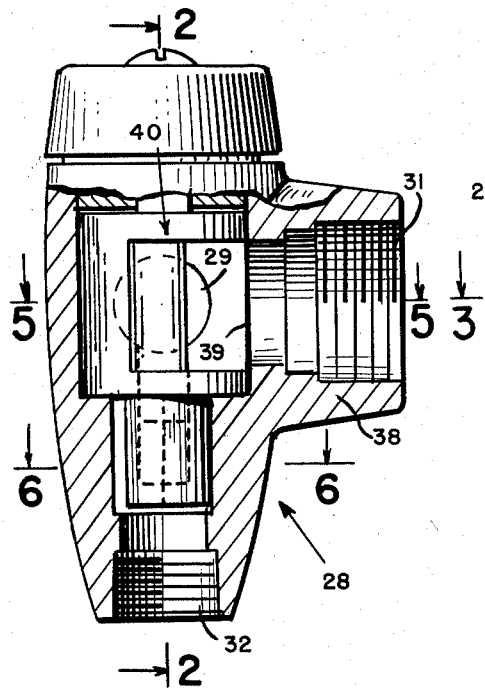
FIG. 1 is a sectional view of a valve embodying the principles of the invention.
Figure 2:
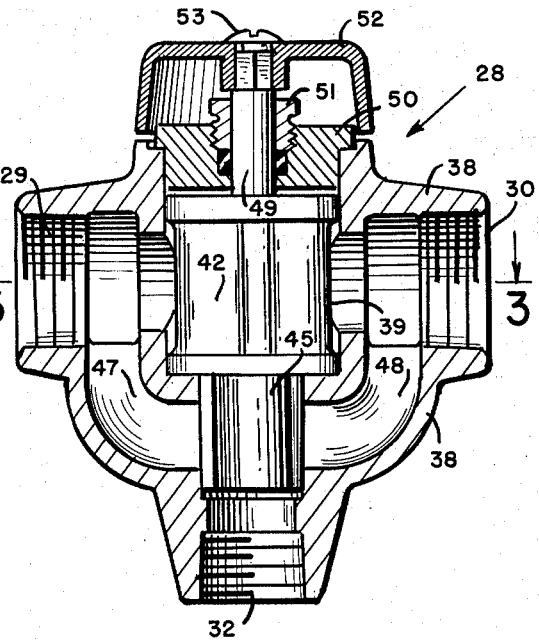
FIG. 2 is a sectional view taken substantially along line 2—2 of FIG. 1.

Referring to FIGS. 1, 2 and 3, the valve 28 may include a body 38 having a central chamber 39 into which the inlet ports 29, 30 and the common return outlet port 31 intersect. The point of intersection of inlet ports 29, 30 and outlet port 31 is bored to receive a rotary plug 40 that is recessed at 41 (FIG. 4), forming a solid portion 42 between flanges 43 and 44. The portion 42 preferably has a somewhat triangular cross sectional form so that the return flow through inlet ports 29 and 30 simultaneously flows through outlet port 31 with plug 40 in the position shown in FIG. 3. The plug 40 may also include a cylindrical portion 45 having a V-notch 46 therein, the sides of which are generally parallel with the sides of portion 42.

Figure 5:
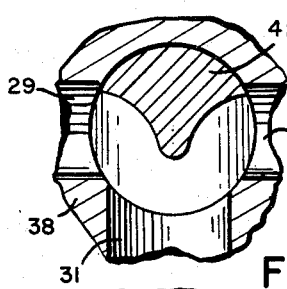
FIG. 5 is a sectional view taken substantially along line 5—5 of FIG. 1.
Figure 7:
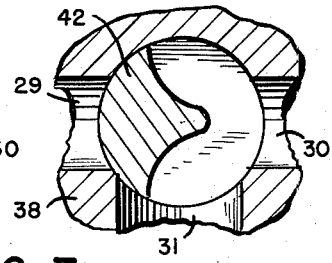
FIGS. 7, 8, 9 and 10 are views similar to FIGS. 5 and 6, showing the plug of the valve in different positions.
Figure 6:
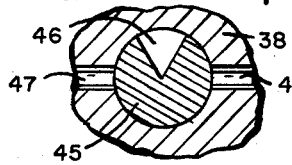
FIG. 6 is a sectional view taken substantially along line 6—6 of FIG. 1.
Figure 8:
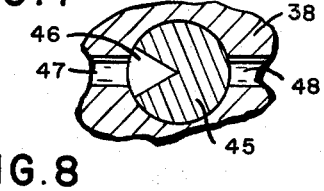
Figure 9:
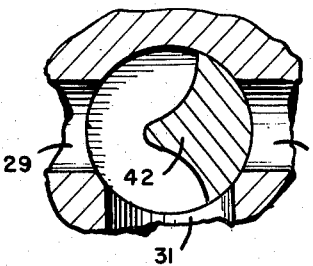
Figure 10:
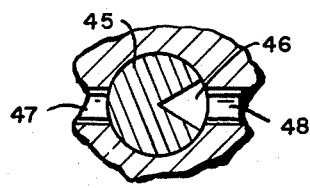

Referring to FIG. 2, a bypass 47 within body 38 may connect inlet port 29 to a drain or purge outlet port 32, and a bypass 48 may connect inlet port 30 to outlet port 32. The plug 40 may include a stem 49 that passes through a cap 50 pressed or threaded into a bore within the body 38. A packing gland 51 may seal the stem 49, and a handle 52 may be attached to the stem 49 by a screw 53. In one rotary position of plug 40 (FIGS. 5 and 6), the entrances from the bypasses 47 and 48 to drain outlet port 32 are blocked by the portion 45 of plug 40, while inlet ports 29 and 30 are open to port 31. When the plug is turned to another rotary position (FIGS. 7 and 8), communication between the inlet port 29 is blocked to the return outlet port 31, while its corresponding bypass 47 is connected through V-notch 46 to drain outlet port 32. In still another rotary position of plug 40 (FIGS. 9 and 10), inlet port 30 is blocked to outlet port 31, while its corresponding bypass 48 is open to drain port 32. Thus, with the valve plug 42 in the position shown in FIGS. 7 and 8, lines 24 and 26 can be purged and the amount of water lost is automatically made up from line 21. When a repair is necessary to a radiator or heating unit in line 24, its inlet valve may be closed so that from that point on to valve 28, line 26 may be drained while retaining heating liquid in lines 25 and 27.

Figure 12:
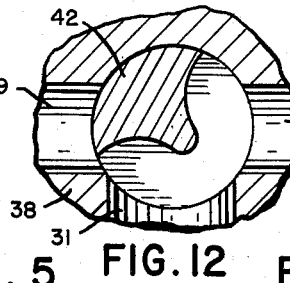
FIGS. 12 and 13 are sections similar to those of FIGS. 5 to 10, showing the valve adjusted to provide different amounts of heating fluid flowing through separate parts of the heating system.
Figure 13:
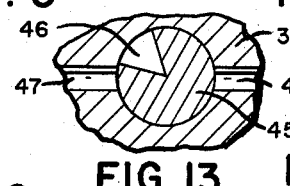

Referring to FIGS. 12 and 13, it is evident that the plug 40 may be turned to a large number of positions between those of FIGS. 5, 6, 7, 8 and 9, 10, at which positions different amounts of heating fluid are returned to the boiler 20 from the separate inlet ports 29 and 30, while both bypasses 47 and 48 are blocked. Accordingly, by turning the plug 40 to these intermediate positions, varying amounts of heating fluid may be supplied to different parts of the system as dictated by the heating requirements of the different parts of the building being heated by said separate parts of the system.

Although the various features of the improved balancing and purge valve have been shown and described in detail to fully disclose one embodiment of the invention, it will be evident that the valve construction could be used in the supply from the boiler to two feed lines and that changes may be made in details and certain features may be used without others without departing from the spirit of the invention except as defined in the appended claims.

What is claimed is:

1. A balancing and purge valve comprising a body; first and second return inlet ports in said body; a common return outlet port in said body; a common outlet drain port in said body; bypass means in said body connecting said inlet ports to said common drain port; and unitary rotary plug means in said body adapted in one rotary position to simultaneously connect said inlet ports to said common return outlet port and to block said bypass means leading to said common outlet drain port, in another rotary position to block said first inlet port to said common return outlet port while opening said first inlet port to said common outlet drain port, and in still another rotary position to block said second inlet port to said common return outlet port while opening said second inlet port to said common outlet drain port.

2. A balancing and purge valve comprising a body including a chamber; first and second inlet ports within said body opening into said chamber; a common outlet port within said body opening into said chamber; a drain outlet port within said body; bypass means connecting said first and second inlet ports to said drain outlet port; rotary plug means mounted within said chamber, said plug means including a portion adapted in one rotary position to simultaneously connect said first and second inlet ports to said common outlet port, in another rotary position to connect said first inlet port to said outlet port while blocking the second inlet port thereto, and in still another rotary position to connect said second inlet port to said outlet port while blocking the first inlet port thereto; and means on said plug for separately connecting said inlet ports to said drain outlet port.

3. A balancing and purge valve comprising a body including a chamber; first and second inlet ports within said body opening into said chamber; a common outlet port within said body opening into said chamber; a drain outlet port within said body; bypass means connecting said first and second inlet ports to said drain outlet port; rotary plug means mounted within said chamber, said plug means including a portion adapted in one rotary position to simultaneously connect said first and second inlet ports to said common outlet port, in another rotary position to connect said first inlet port to said outlet port while blocking the second inlet port thereto, and in still another rotary position to connect said second inlet port to said outlet port while blocking the first inlet port thereto; and an axially extending V-notch in said plug adapted to cooperate with said bypass means and said drain outlet port for separately connecting said inlet ports to said drain outlet port.

4. In a heating system, a boiler; separate heating devices; a circulating pump; a balancing and purge valve having separate inlet ports; separate lines leading from said boiler for conveying heated fluid to said separate heating devices; separate return lines leading from said devices to the separate inlet ports of said balancing and purge valve; and a single line leading from said valve to the circulating pump and thence to said boiler, said valve including a drain outlet port and including means adapted in one position to simultaneously connect said separate return lines to said single line leading to said pump, and in other positions to drain each separate line independently of the other.

5. A balancing and purge valve comprising a body; first and second return inlet ports in said body; a common return outlet port in said body; a common outlet drain port in said body; bypass means in said body connecting said inlet ports to said common drain port; and unitary rotary plug means in said body adapted in a plurality of rotary positions to simultaneously connect said inlet ports to said common return outlet port such that differing amounts of fluid pass through said inlet ports while blocking said bypass means leading to said common outlet drain port, in another rotary position to block said first inlet port to said common return outlet port while opening said first inlet port to said common outlet drain port, and in still another rotary position to block said second inlet port to said common return outlet port while opening said second inlet port to said common outlet drain port.

6. A balancing and purge valve comprising a body including a chamber; first and second inlet ports within said body opening into said chamber; a common outlet port within said body opening into said chamber; a drain outlet port within said body; bypass means connecting said first and second inlet ports to said drain outlet port; rotary plug means mounted within said chamber, said plug means including a portion adapted in a plurality of rotary positions to simultaneously connect said inlet ports to said common return outlet port such that differing amounts of fluid pass through said inlet ports while blocking said bypass means leading to said common outlet drain port, in another rotary position to connect said first inlet port to said outlet port while blocking the second inlet port thereto, and in still another rotary position to connect said second inlet port to said outlet port while blocking the first inlet port thereto; and means on said plug means for separately connecting said inlet ports to said drain outlet port.

7. A balancing and purge valve comprising a body including a chamber; first and second inlet ports within said body opening into said chamber; a common outlet port within said body opening into said chamber; a drain outlet port within said body; bypass means connecting said first and second inlet ports to said drain outlet port; rotary plug means mounted within said chamber, said plug means including a portion adapted in a plurality of rotary positions to simultaneously connect said inlet ports to said common return outlet port such that differing amounts of fluid pass through said inlet ports while blocking said bypass means leading to said common outlet drain port, in another rotary position to connect said first inlet port to said outlet port while blocking the second inlet port thereto, and in still another rotary position to connect said second inlet port to said outlet port while blocking the first inlet port thereto; and an axially extending V-notch in said plug means adapted to cooperate with said bypass means and said drain outlet port for separately connecting said inlet ports to said drain outlet port.

8. In a heating system, a boiler; separate heating devices; a circulating pump; a balancing and purge valve having separate inlet ports; separate lines leading from said boiler for conveying heated fluid to said separate heating devices; separate return lines leading from said devices to the separate inlet ports of said balancing and purge valve; and a single line leading from said valve to the circulating pump and thence to said boiler, said valve including a drain outlet port and including means adapted in a plurality of positions to simultaneously connect said separate return lines to said single line leading to said pump such that different amounts of heating fluid pass through said separate return lines, and in other positions to drain each separate line independently of the other.

9. A balancing and purge valve comprising a body; first and second ports in said body; a port common to said first and second ports in said body; a common outlet drain port in said body; bypass means in said body connecting said first and second ports to said common drain port; and unitary rotary plug means in said body adapted in one rotary position to simultaneously connect said first and second ports to said common port and to block said bypass means leading to said common outlet drain port, in another rotary position to block said first port to said common port while opening said first port to said common outlet drain port, and in still another rotary position to block said second port to said common port while opening said second port to said common outlet drain port.

10. A balancing and purge valve comprising a body; first and second ports in said body; a port common to said first and second ports in said body; a common outlet drain port in said body; bypass means in said body connecting said first and second ports to said common drain port; unitary rotary plug means in said body adapted in one rotary position to simultaneously connect said first and second ports to said common port and to block said bypass means leading to said common outlet drain port, in another rotary position to block said first port to said common port while opening said first port to said common outlet drain port, and in still another rotary position to block said second port to said common port while opening said second port to said common outlet drain port; and means on said plug for separately connecting said first and second ports to said outlet drain port.

References Cited by the Examiner
UNITED STATES PATENTS

| | | | |
|---|---|---|---|
| 141,102 | 7/73 | Bate | 137—625.22 |
| 170,576 | 11/75 | Malcolm | 137—625.22 |
| 889,964 | 6/08 | Powell | 137—625.41 |
| 988,504 | 4/11 | Pride | 137—625.41 |
| 1,050,397 | 1/13 | Smart | 237—56 |
| 1,606,108 | 11/26 | Sklar | 237—56 |
| 1,642,623 | 9/27 | Niven | 137—625.41 |
| 1,830,067 | 11/31 | Mellers et al. | 137—625.4 |
| 3,012,752 | 12/61 | Buck | 137—625.41 |

EDWARD J. MICHAEL, *Primary Examiner.*